(12) United States Patent
Garabello et al.

(10) Patent No.: US 8,915,814 B2
(45) Date of Patent: Dec. 23, 2014

(54) GEAR-CHANGE DEVICE FOR A MOTOR VEHICLE

(71) Applicant: C.R.F. Societá Consortile per Azioni, Orbassano (Torino) (IT)

(72) Inventors: Marco Garabello, Orbassano (IT); Andrea Piazza, Orbassano (IT)

(73) Assignee: C.R.F. Societá Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 14/019,676

(22) Filed: Sep. 6, 2013

(65) Prior Publication Data
US 2014/0171248 A1    Jun. 19, 2014

(30) Foreign Application Priority Data
Dec. 18, 2012  (EP) .................................. 12197841

(51) Int. Cl.
| | | |
|---|---|---|
| F16H 3/72 | (2006.01) | |
| F16H 37/06 | (2006.01) | |
| B60K 6/547 | (2007.10) | |
| F16H 3/093 | (2006.01) | |
| F16H 3/44 | (2006.01) | |

(52) U.S. Cl.
CPC ......... B60K 6/547 (2013.01); *F16H 2003/0931* (2013.01); *F16H 2003/442* (2013.01); *Y10S 903/902* (2013.01)
USPC .................................. 475/5; 74/661; 903/902

(58) Field of Classification Search
USPC .................................................. 475/5; 74/661
See application file for complete search history.

(56) References Cited

U.S. PATENT DOCUMENTS 6,332,257 B1 * 12/2001 Reed et al. .................... 29/401.1
6,793,600 B2 *  9/2004 Hiraiwa ............................ 475/5

FOREIGN PATENT DOCUMENTS

| | | |
|---|---|---|
| CN | 201 777 113 U | 3/2011 |
| CN | 202 283 871 U | 6/2012 |
| DE | 101 33 695 A1 | 3/2002 |
| EP | 2 345 829 A1 | 7/2011 |
| EP | 2 385 270 A1 | 11/2011 |
| EP | 2 390 127 A1 | 11/2011 |
| JP | 2009 154610 A | 7/2009 |
| JP | 2012 201117 A | 10/2012 |

OTHER PUBLICATIONS

European Search Report from corresponding European Patent Application No. EP 12197841.5 completed on Apr. 5, 2013 and mailed on Apr. 12, 2013.

* cited by examiner

*Primary Examiner* — Dirk Wright
(74) *Attorney, Agent, or Firm* — Heslin Rothenberg Farley & Mesiti PC; Victor A. Cardona, Esq.

(57) ABSTRACT

A gear-change device includes a primary shaft, a secondary shaft, and a third shaft, which bears both a gear of the reverse and an output pinion meshing with a gear of a differential. The third shaft is connected via a gear reducer to the shaft of an electrical machine, the casing of which is rigidly connected to the easing of the gear-change device.

12 Claims, 5 Drawing Sheets

GEAR-CHANGE DEVICE FOR A MOTOR VEHICLE

CROSS REFERENCE TO RELATED APPLICATIONS

This application claims priority from European Patent Application No. 12197841.5 filed on Dec. 18, 2012, the entire disclosure of which is incorporated herein by reference.

FIELD OF THE INVENTION

The present invention relates to gear-change devices for motor vehicles, of the type comprising:
- at least one primary shaft, which can be connected to the crankshaft of the motor vehicle by means of a clutch device;
- at least one secondary shaft, the axis of which is parallel to and set at a distance from the axis of said primary shaft, and which bears an output pinion that is to mesh with the gear of a differential;
- a plurality of pairs of gears corresponding to a plurality of forward-gear ratios, in which the gears of each pair are one that is rigidly connected in rotation to one of said primary and secondary shafts, whereas the other is freely rotatable with the other of said primary and secondary shafts;
- a plurality of gear-selection devices for coupling in rotation each of said freely rotatable gears with the shaft on which it is mounted;
- a reverse gear mounted freely rotatable on a third shaft, the axis of which is set at a distance both from the axis of said primary shaft and from the axis of said secondary shaft, said reverse gear being connectable in rotation to said third shaft by means of a reverse-gear selection device,
- said reverse gear always meshing with a gear mounted freely rotatable on the secondary shaft and forming part of one of said pairs of forward gears,
- wherein said third shaft is connected to the shaft of an electrical machine associated to said gear-change device and designed to operate both as electric motor and as electric generator, and having a casing rigidly connected to the casing of said gear-change device.

A gear-change device of the type specified above is, for example, illustrated in FIG. 3 of the document No. EP 2 345 829 A1.

Gear-change devices of the type specified above provide a hybrid transmission in which the electrical machine is used as electric motor designed to deliver a torque to the gears of the vehicle for example in the phases of gearchange in order to compensate for the drop in torque that occurs in these phases. At the same time, the electrical machine is used as generator to recover energy in all the phases in Which the transmission is entrained by the gears of the vehicle.

OBJECT OF THE INVENTION

The object of the present invention is to provide a gear-change device of the type referred to above that will be particularly advantageous from the standpoint of the simplicity of construction and of the reduction of the space occupied.

With a view to achieving the above purpose, the subject of the invention is a gear-change device having all the characteristics that have been referred to above and further characterized in that the aforesaid third shaft that carries the reverse gear and that is connected to the shaft of the electrical machine also carries a second output pinion that is to mesh directly with the gear of the differential.

Thanks to the characteristics specified above, the gear-change device according to the invention enables association of an electrical machine to the gear-change device without entailing a complex and cumbersome structure.

BRIEF DESCRIPTION OF THE FIGURES

The invention will now be described with reference to the annexed drawings, which are provided purely by way of non-limiting example and in which.

DETAILED DESCRIPTION OF THE INVENTION

The annexed drawings show examples of application of the invention to a gear-change device of a manual type, with just one primary shaft and two secondary shafts. It is, however, evident that the invention is applicable also to gear-change devices of a completely different type and in particular, for example, to gear-change devices having two coaxial primary shafts that can be connected selectively to the crankshaft by means of a double-clutch device and in general to any type of gear-change device, either manual or automatic.

Figure 1:
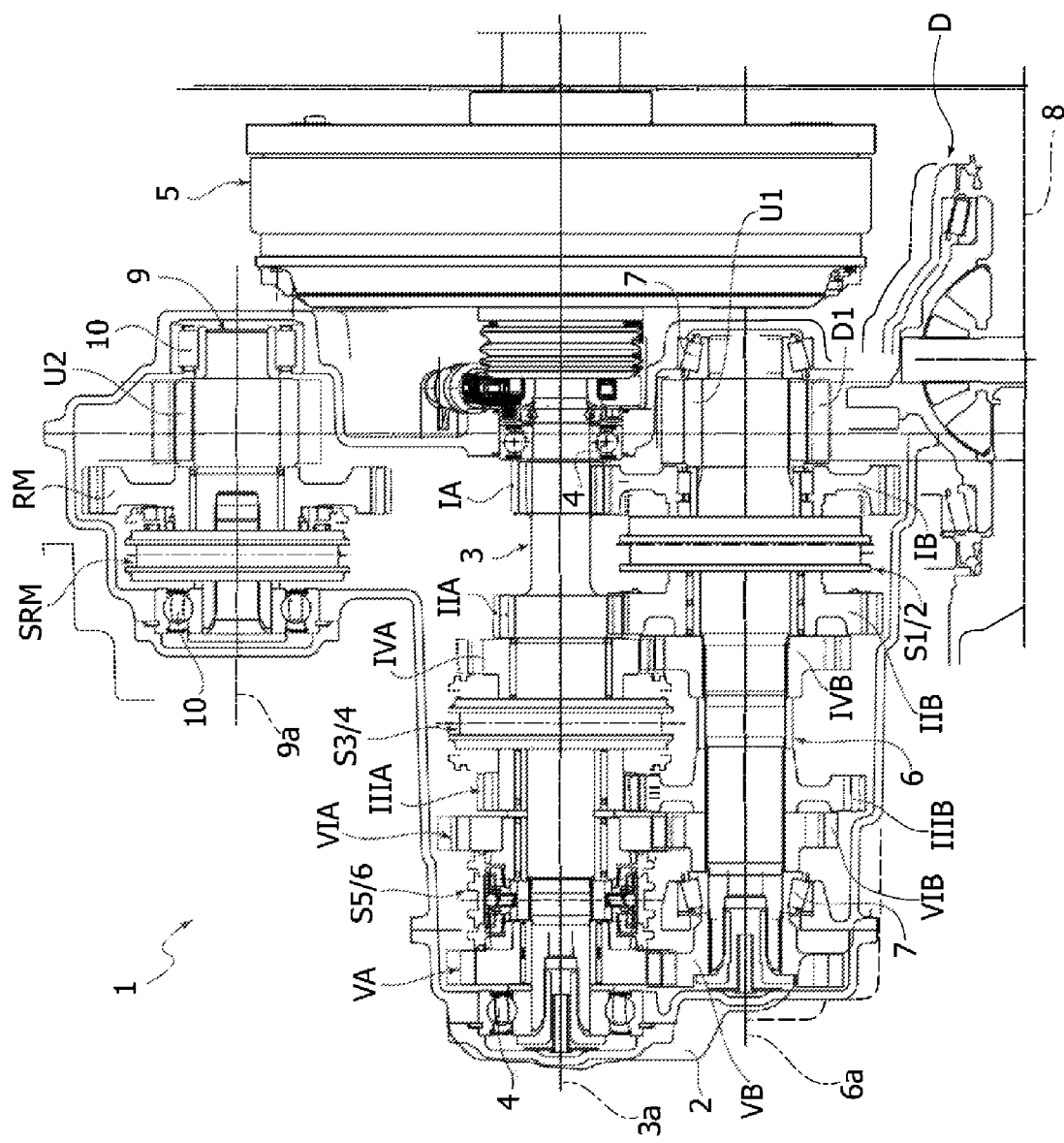
FIG. 1 is a cross-sectional view of a gear-change device to which the invention is applied.

As already mentioned, FIG. 1 shows the general configuration of the gear-change device to which the examples of application of the invention that are described hereinafter refer.

With reference to FIG. 1, number 1 designates as a whole the gear-change device, having a casing 2 within which a primary shaft 3 is rotatably supported by means of bearings 4. One end of the primary shaft 3 (the one on the right in FIG. 1) can be connected to the crankshaft by means of a clutch device 5 of any known type.

The gear-change device comprises a secondary shaft 6 that is supported in rotation within the casing 2 by means of bearings 7. The secondary shaft 6 has its axis 6a parallel and set at a distance from the axis 3a of the primary shaft.

The gear-change device comprises a plurality of pairs of gears corresponding to the various forward-gear ratios. In particular, the first gear ratio is defined by a gear IA carried by the primary shaft 3 and meshing with a gear IB mounted freely rotatable on the secondary shaft 6.

The second gear ratio is defined by a gear IIA carried by the primary shaft 3 and meshing with a gear IIB mounted freely rotatable on the secondary shaft 6A. A selection device S1/2 of any type in itself known, illustrated only schematically in FIG. 1, can be shifted axially from a neutral position to a position of engagement of the first gear or, on the opposite side, to a position of engagement of the second gear, where the gear IB or the gear IIB, respectively, are connected in rotation to the secondary shaft 6. The drawings do not show the means of actuation of the gear-selection devices, which can be obtained in any known way and do not fall, taken in themselves, within the scope of the present invention.

The third gear ratio is defined by a gear IIIA mounted freely rotatable on the primary shaft 3 and meshing with a gear IIIB that is carried by the secondary shaft 6.

The fourth gear ratio is defined by a gear IVE mounted freely rotatable on the primary shaft 3 and meshing with a gear IVB carried by the secondary shaft 6. The reference S3/4 designates the selection device that controls engagement of the third gear or of the fourth gear, by respectively connecting the gear IIIA or the gear IVE to the primary shaft 3.

A fifth gear ratio is defined by a gear VA mounted freely rotatable on the primary shaft 3 and meshing with a gear VB connected in rotation to the secondary shaft 6.

Finally, a sixth gear ratio is defined by a gear VIA mounted freely rotatable on the primary shaft 3 and meshing with a gear VIB connected in rotation to the secondary shaft 6. The reference S5/6 designates the selection device that controls engagement of the fifth gear or of the sixth gear connecting, respectively, the gear VA or the gear VIA to the primary shaft 6.

The secondary shaft 6 also carries an output pinion U1 that meshes with a ring gear D1 of a differential D.

Figure 2:
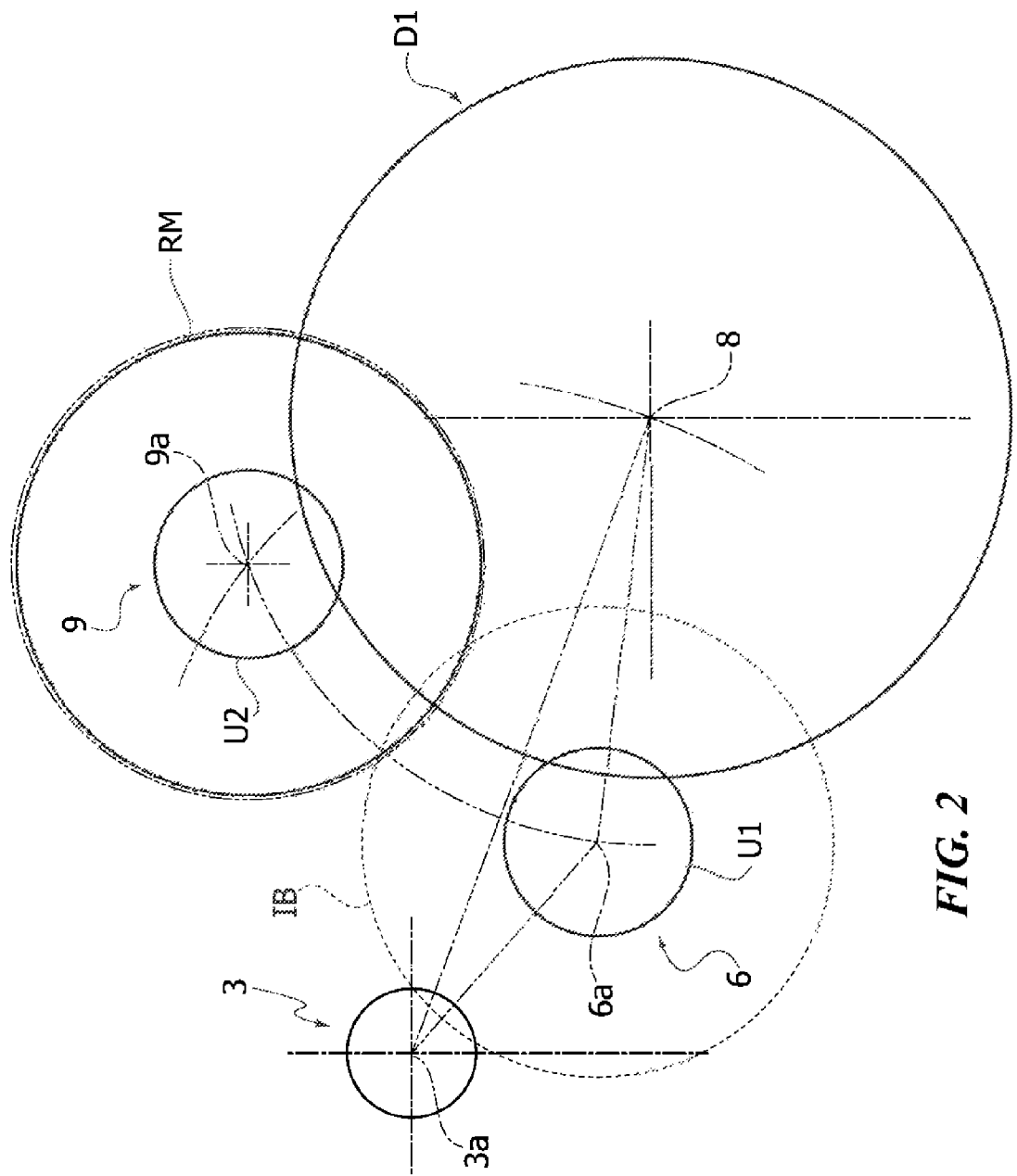
FIG. 2 is a schematic side view from which there emerges the arrangement of the gear-change axes of FIG. 1.

FIG. 2 of the annexed drawings shows the positioning in space of the axes 3A and 6A of the primary shaft 3 and of the secondary shaft 6, respectively, as well as the axis 8 of the ring gear D1 of the differential D (illustrated schematically in FIG. 2).

The gear-change device 1 further comprises a third shaft 9, bearing a gear RM for the reverse. The shaft 9 has its axis 9a parallel to and set at a distance both from the axis 3A of the primary shaft 3 and from the axis 6A of the secondary shaft 6.

The reverse gear RM is mounted freely rotatable on the third shaft 9 and meshes permanently with the gear IB, which, as mentioned above, is mounted freely rotatable on the secondary shaft 6.

The third shaft 9 is supported in rotation within the casing 2 by means of bearings 10 and carries a second output pinion U2, which also meshes with the column D1 of the differential.

FIG. 1 illustrates a gear-change device designed without the further characteristics that form the subject of the present invention.

Figure 3:
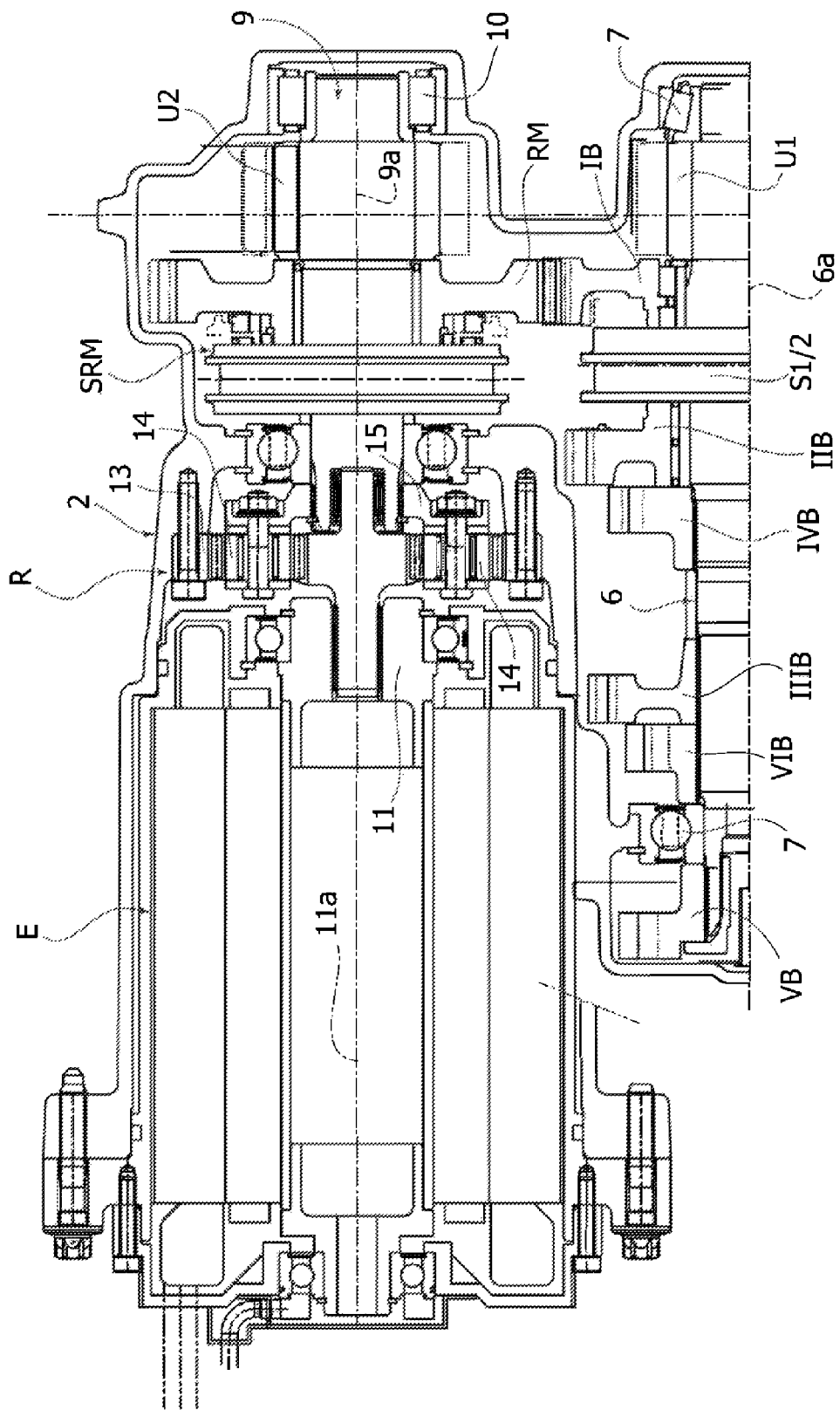
FIGS. 3-5 are views in cross section of three different embodiments of the invention, applied to the gear-change device of FIGS. 1 and 2.
Figure 4:
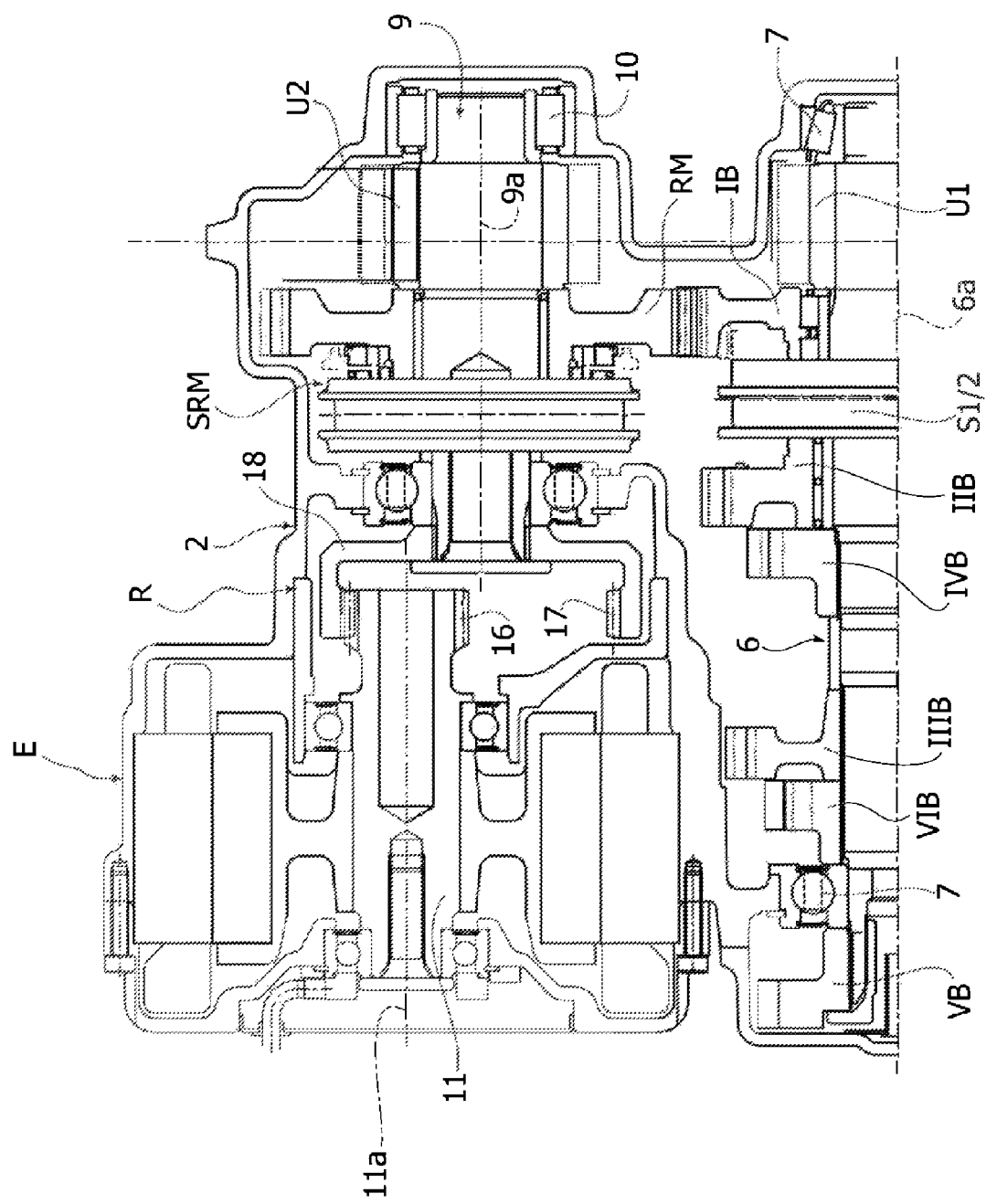
Figure 5:
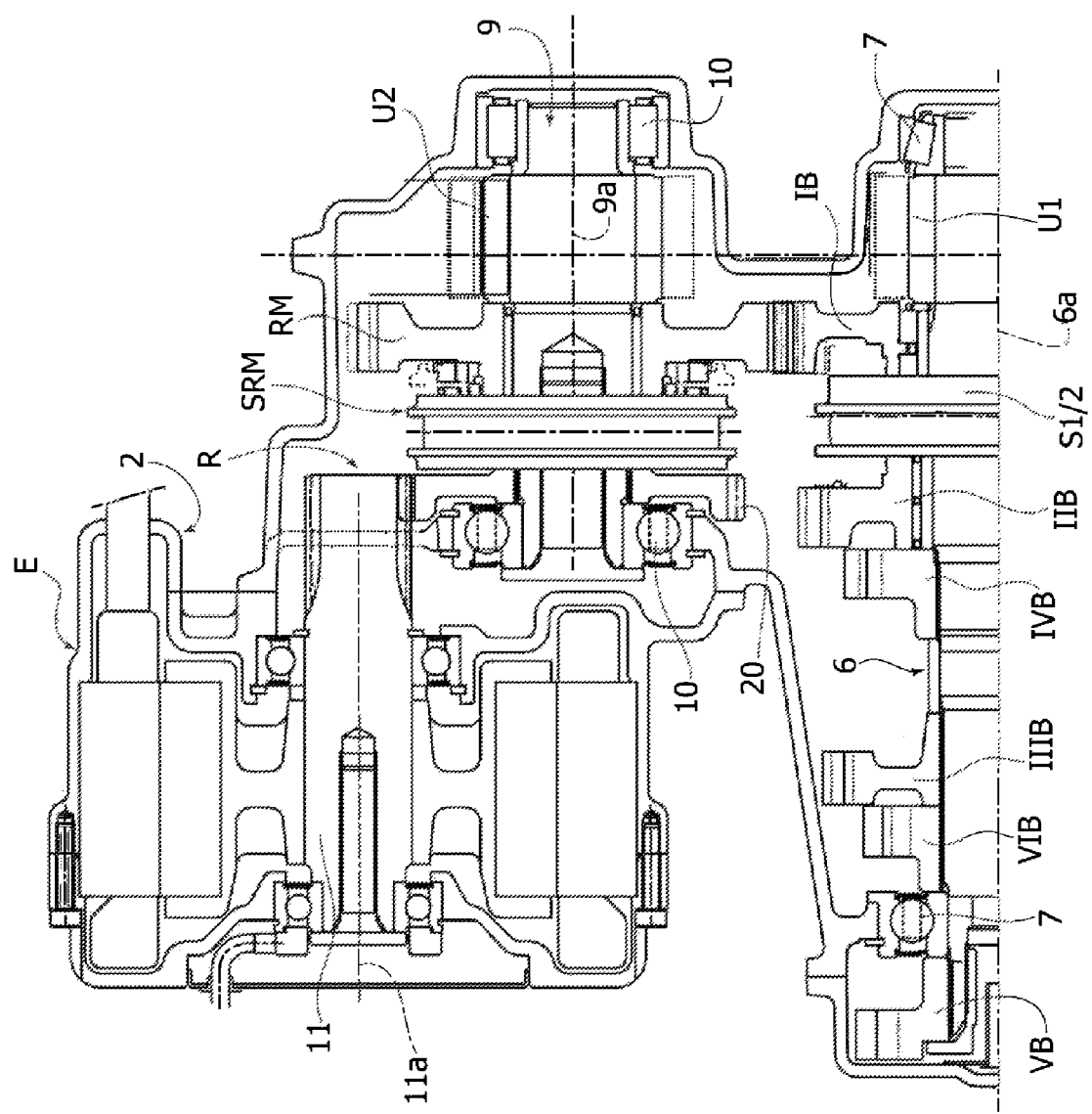

FIGS. 3-5 show three different embodiments of the invention, applied to the gear-change of FIG. 1. In all of FIGS. 3 to 5, the third shaft 9 of the gear-change device is connected to the shaft 11 of an electrical machine E of any known type, designed to operate both as electric motor and as electric generator. The casing of the electrical machine E is rigidly connected to the casing 2 of the gear-change device and, in the case of the examples illustrated, for a major part thereof is integrated in a single piece with the casing of the gear-change device.

The solution of FIG. 3 envisages a connection between the shaft 11 of the electrical machine E and the third shaft 9 obtained by means of a gear-reducer device in the form of a planetary gear train, which makes it possible to have the axes 9a and 11a that coincide with one another.

More specifically, the planetary gear train, designated as a whole by R, comprises a sun gear 12 connected in rotation to the shaft 11 of the electrical machine E, an outer ring gear with internal toothing 13 constituted by an annular element rigidly connected to the casing 2 and a plurality of planet gears 14 that mesh with the sun gear 12 and with the ring gear 13 and that are carried by a gear-train-carrier member 15 connected in rotation to the third shaft 9 of the gear change.

FIG. 4 illustrates a second embodiment that differs from that of FIG. 3 in that the gear reducer R that connects the shaft 11 of the electrical machine E to the third shaft 9 of the gear-change device is constituted by a pair of gears including a pinion 16, which is carried by the shaft 11 of the electrical machine E and meshes with a ring gear with internal toothing 17 made on a bell-shaped element 18 connected in rotation to the third shaft 9 of the gear change.

The solution of FIG. 4 involves a distancing between the parallel axes 11a, 9a of the shafts 11, 9. Moreover, it enables the designer to position the axis 11a in different possible angular positions about the axis 9a of the third shaft 9.

FIG. 5 shows a further embodiment that differs from the ones described above in that the reducer R that connects the shaft 11 of the electrical machine to the third shaft 9 of the gear change comprises a pair of gears including a gear 19, which is carded by the shaft 11 of the electrical machine E and meshes with a gear 20 carried by the third shaft 9 of the gear change. Also in the case of the solution of FIG. 5, the axes 11a, 9a are set at a distance from one another, and also in this case the designer has the possibility of choosing different possible positions of the axis 11a about the axis 9a of the third shaft 9 of the gear change.

As emerges clearly from the foregoing description, an essential characteristic of the gear-change device according to the invention lies in the fact that it envisages a third shaft 9 that carries both the gear RM for the reverse and an output pinion U2 meshing with the ring gear of the differential, said shaft being moreover connected to the shaft of the electrical machine E by means of a gear reducer.

The above characteristics enable association of the electrical machine E to the gear-change device, keeping the structure of the gear-change device extremely simple and far from cumbersome.

Of course, without prejudice to the principle of the invention, the details of construction and the embodiments may vary widely with respect to what has been described and illustrated herein purely by way of example, without thereby departing from the scope of the present invention.

It is in particular evident that the teachings of the present invention may be applied also to gear-change devices of a type different from what has been described and illustrated herein purely by way of example and in particular also to a gear-change device of the type comprising two coaxial primary shafts and a double-clutch device, as well as to gear changes both of a manual type and of a robotized type.

Even though the examples illustrated herein make use of gear reducers with a single gear-reduction stage for connection of the shaft of the electrical machine to the third shaft of the gear-change device, the invention also envisages the possibility of using two or more cascaded gear-reducer devices to provide a number of reduction stages in the connection between the shaft of the electrical machine E and the third shaft 9 of the gear change.

What is claimed is:

1. A gear-change device for a motor vehicle, comprising:
at least one primary shaft, which can be connected to a crankshaft of the motor vehicle by a clutch device;
at least one secondary shaft, an axis of which is parallel to and set at a distance from an axis of said primary shaft, and which bears an output pinion that is to mesh with a gear of a differential;
a plurality of pairs of gears corresponding to a plurality of forward-gear ratios, in which gears of each pair are one that is rigidly connected in rotation to one of said primary and secondary shafts and another that is freely rotatable with respect to the other of said primary and secondary shafts;
a plurality of gear-selection devices for coupling in rotation each of said freely rotatable gears with the shaft on which it is mounted; and
a reverse gear mounted freely rotatable on a third shaft, the axis of which is set at a distance both from the axis of said primary shaft and from the axis of said secondary shaft, said reverse gear being connectable in rotation to said third shaft by means of a reverse-gear selection device, said reverse gear always meshing with a gear mounted freely rotatable on the secondary shaft forming part of one of said pairs of forward gears, wherein said third shaft is connected via a gear reducer to a shaft of an electrical machine associated to said gear-change device and designed to operate both as electric motor and as electric generator and having a casing rigidly connected to a casing of said gear-change device, and wherein said third shaft carries a second output pinion configured to mesh directly with the gear of the differential.

2. The gear-change device according to claim 1, wherein the comprises a planetary-gear reducer and the axes of the shaft of the electrical machine and of the third shaft are aligned with one another.

3. The gear-change device according to claim 2, wherein the planetary gear train comprises a sun gear connected to the shaft of the electrical machine, an outer ring gear, rigidly connected to the casing of the gear-change device, and a plurality of planet gears meshing with the sun gear and with the ring gear and carried by a gear-train-carrier member connected to the aforesaid third shaft.

4. The gear-change device according to claim 1, wherein said gear reducer comprises a pair of gears, including a gear carried by the shaft of the electrical machine and a ring gear with internal toothing meshing with said gear carried by the shaft of the electrical machine and connected in rotation to said third shaft, said third shaft and the shaft of the electrical machine having their axes set parallel to and at a distance from one another.

5. The gear-change device according to claim 1, wherein said gear reducer comprises a pair of gears, including a gear carried by the shaft of the electrical machine and a gear with external toothing meshing with said gear carried by the shaft of the electrical machine and connected in rotation to said third shall, the axes of the shaft of the electrical machine and of the third shaft being set parallel to and at a distance from one another.

6. The gear-Change device according to claim 1, wherein said reducer comprises a number of reduction stages.

7. The gear-change device according to claim 1, wherein the casing of said electrical machine is at least in part integrated in a single piece with the casing of the gear-change device.

8. The gear-change device according to claim 2, wherein the casing of said electrical machine is at least in part integrated in a single piece with the casing of the gear change device.

9. The gear-change device according to claim 3, wherein the casing of said electrical machine is at least in part integrated in a single piece with the casing of the gear-change device.

10. The gear-change device according to claim 4, wherein the casing of said electrical machine is at least in part integrated in a single piece with the casing of the gear-change device.

11. The gear-change device according to claim 5, wherein the casing of said electrical machine is at least in part integrated in a single piece with the casing of the gear-change device.

12. The gear-change device according to claim 6, wherein the casing of said electrical machine is at least in part integrated in a single piece with the casing of the gear-change device.

* * * * *

UNITED STATES PATENT AND TRADEMARK OFFICE
CERTIFICATE OF CORRECTION

PATENT NO. : 8,915,814 B2
APPLICATION NO. : 14/019676
DATED : December 23, 2014
INVENTOR(S) : Garabello et al.

Page 1 of 1

It is certified that error appears in the above-identified patent and that said Letters Patent is hereby corrected as shown below:

On the title page item [57], Line 6: Delete "easing" and insert -- casing --

In the Claims

Column 5, Line 16: Claim 2, Delete "wherein the comprises" and insert -- wherein the gear reducer comprises --

Signed and Sealed this
Twelfth Day of May, 2015

Michelle K. Lee
*Director of the United States Patent and Trademark Office*